Nov. 30, 1965   D. J. STOKER   3,220,926
NUCLEAR REACTOR CORE UNIT CELL
Filed June 16, 1960   2 Sheets-Sheet 1

INVENTOR.
DONALD J. STOKER
BY
Gerald A. Koris
ATTORNEY

Nov. 30, 1965

D. J. STOKER 3,220,926

NUCLEAR REACTOR CORE UNIT CELL

Filed June 16, 1960

INVENTOR.
DONALD J. STOKER

BY

*Gerald A. Koris*

ATTORNEY

United States Patent Office 3,220,926
Patented Nov. 30, 1965

3,220,926
NUCLEAR REACTOR CORE UNIT CELL
Donald J. Stoker, Reseda, Calif., assignor to
North American Aviation, Inc.
Filed June 16, 1960, Ser. No. 36,629
7 Claims. (Cl. 176—50)

My invention relates to a unit cell for a nuclear reactor, and more particularly to a unit cell for a nuclear reactor core which separates the coolant and the fuel in an optimum heat transfer relationship.

The fuel element and the fuel cycle of a nuclear reactor represent a substantial factor in the cost of nuclear power generation. Fuel elements commonly must be clad with a protective metal in order to prevent contamination of the coolant with fission products, and to protect the fuel from corrosive or erosive attack by the coolant. Since in such designs the coolant is in intimate physical contact with the fuel element, refueling of the core while the reactor is operating cannot be practically achieved. Replacing fuel elements and programming fuel elements in different core positions to adjust for different burnup rates resulting from variations in peak-to-average flux distributions is highly desirable. Such refueling and programming gives maximum fuel management, enabling peak-to-average fuel burnup ratios of approximately unity to be realized, thereby improving the economics of the fuel cycle.

Direct contacting of fuel and coolant is employed in the current water-cooled power reactors of both the pressurized and boiling water varieties. The necessary pressurization for the water in such reactors is conventionally supplied by a pressure vessel enclosing the entire reactor core. The limiting factor in the size of water reactors is the size of the pressure vessel which can be fabricated. In such pressurized systems continuous refueling and fuel programming is made impractical by the high pressure, dynamic environment which would have to be penetrated. Reactor shutdown to accomplish refueling represents, of course, an economic loss during the period of shutdown. Further, contacting of the fuel and coolant in direct cycle reactors carries risk of contamination of the power generation system, particularly in the case of the boiling water reactors where steam is transmitted directly to the turbine without an intermediate heat exchanger.

It is, accordingly, an object of my present invention to provide an improved unit cell for a nuclear reactor core.

Another object is to provide an improved unit cell for a nuclear reactor core wherein the fuel and coolant are completely separated with the fuel disposed in a channel of loose tolerance.

Another object is to provide such a unit cell for a nuclear reactor core wherein coolant tubes penetrate a moderator body separate from the fuel, while providing an efficient heat path between the heat source and the heat sink.

A further object is to provide such a cell wherein unclad, simply fabricated fuel elements may be used with assurance that no fission products can enter the coolant stream.

A still further object is to provide such a cell of a configuration which minimizes the moderator temperature for any given heat flux.

Still other objects and advantages of my invention will become apparent from the following detailed description taken in conjunction with the accompanying drawings.

In the drawings, FIG. 1 is a perspective view of my basic cell;

Figures 1, 2:
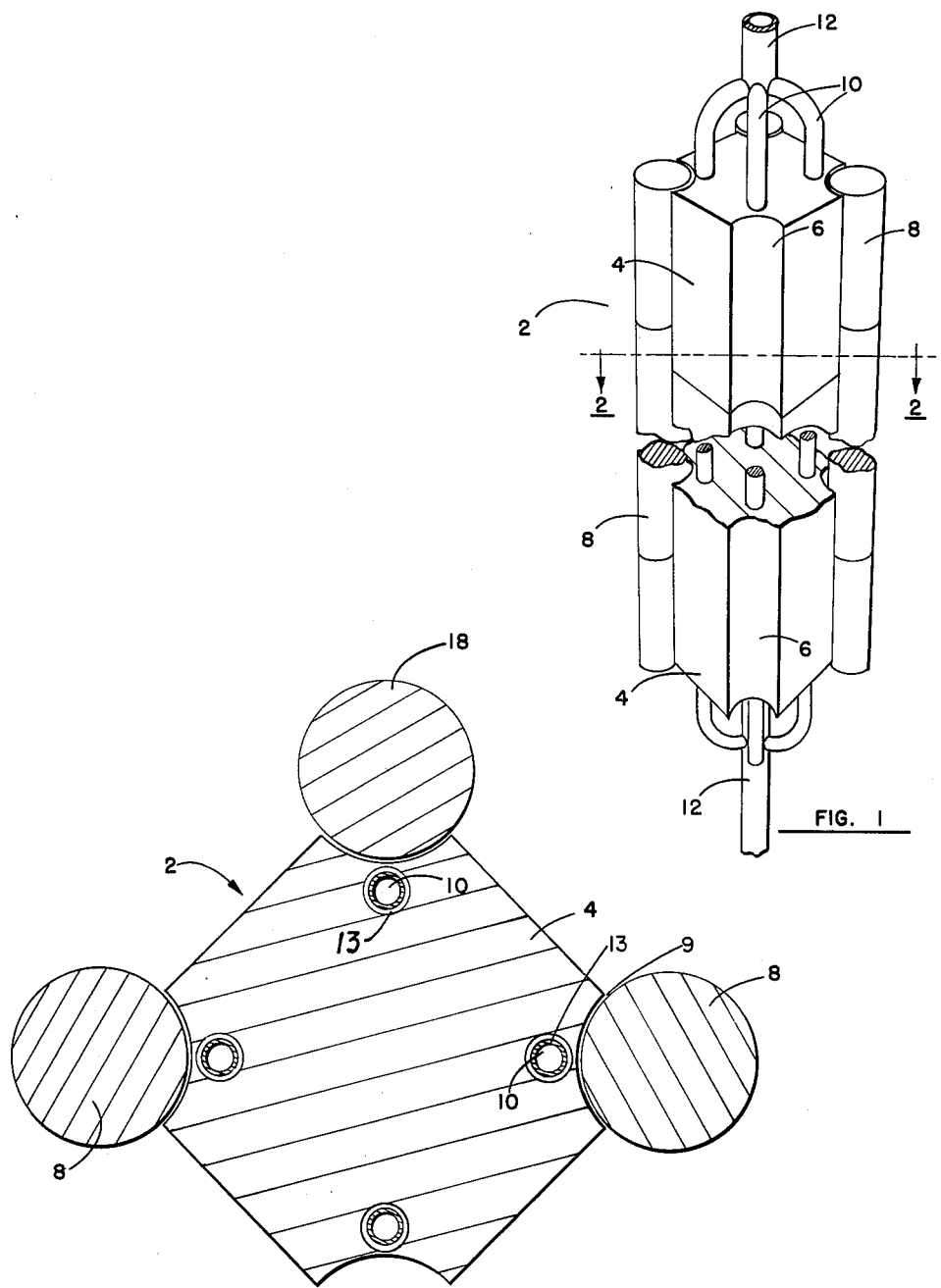
FIG. 2 is a cross section taken along the lines 2—2.

The lattice cell 2, as shown by the embodiment in FIGS. 1 and 2, consists of a moderator block 4 having at its corners a longitudinal recess or scallop 6 defining a fuel channel segment. Since the segment is on a 90° cut, four adjoining such unit cells combine to define a complete fuel process channel. The fuel elements 8 are disposed in the fuel channel segment, the major or longitudinal axis of the fuel elements being parallel to the major axis of the moderator block, an annulus 9 remaining between the fuel element and the moderator block. Coolant tubes 10, one for each fuel channel segment, penetrate moderator block 2 from a common coolant inlet line 12, and upon leaving the moderator block, the coolant tube is again joined to common line 12. A small annulus 13 exists between the coolant line and moderator block. The coolant tubes 10 are positioned along the diagonals of the moderator block, immediately adjacent the fuel channel segment defined by scallop 6. The coolant tubes are thus positioned on a line bisecting the fuel channel segment and passing through the center of the block to the opposite corner.

In a broader sense, my invention is applicable to other multi-sided moderator blocks such as triangular, rectangular, pentagonal, hexagonal, octagonal, etc. lattice cell configurations where the coolant tubes penetrate the moderator block and the fuel is located in channels on the edges of the moderator block. Basically, then, a coolant tube is provided for each of at least one line dividing the fuel channel segment into equal parts. Thus, for example, if two coolant tubes per process channel are used, they would be positioned immediately adjacent to the fuel channel along the two lines which divide the fuel channel into equal segments. In the case of a single fuel tube, as above, and thus a single dividing line, the coolant tube is positioned along the line dividing (bisecting) the fuel channel into two equal portions and, in the case of two coolant tubes per fuel channel segment, the tubes would be positioned along the two lines dividing the fuel channel into three equal parts. Although the fuel channel is preferably located at the corners of multi-sided (i.e., flat-sided) moderator blocks, the fuel channels may also be disposed along the flats of such blocks.

The placement of coolant tubes along lines dividing the fuel channel into equal segments is important in minimizing the temperature conditions in the moderator block. A low moderator temperature, both at the surface and throughout the block, results in better neutron economy. This is because the ratio of fission cross section to capture cross section for uranium–235 is greater at lower temperatures. In addition, when using graphite as moderator and water or steam as coolant, the reaction rate between steam and graphite in event of a tube rupture is markedly less with a lower graphite temperature.

The importance of the position of the coolant tubes is shown by an example comparing the case where the coolant tubes are located in the moderator equi-distant between the fuel elements. This calculation is based on 611° F. boiling water in the tubes and 8″ square graphite lattice. When a heat flux of 46 kw./ft.² of fuel produces a graphite surface temperature in the lattice cell of FIGS. 1–2 of 1400° F., a temperature of 2000° F. is reached under the same conditions in a cell having coolant tubes spaced equi-distant between fuel elements. The 600° F. temperature difference represents a change greater than three orders of magnitude in the reaction rate between steam and graphite in the event of a coolant tube rupture.

Since the coolant is separate from the fuel and is at a much higher pressure, there is no danger of fission products entering the coolant and contaminating the steam system. This solves one of the most important problems associated with the development of reactors with nuclear superheat; namely, the problem of preventing fission products from entering the turbine, condenser, etc. This also reduces the requirement for special turbine seals and other expensive equipment to prevent the escape of radioactivity from the coolant system to the atmosphere.

The heat generated in the fuel element is transferred to the coolant by radiation from the fuel element 8 through annulus 9 to moderator block 4; conduction through the moderator, annulus 13, and the coolant tube wall; and convection from the tube wall to the coolant.

Considering now the materials for my unit cell, a wide variety of conventional core structural materials may be used, and the use of any particular material is not necessary. The moderator block may be composed of any solid moderator, for instance graphite, beryllium, beryllium oxide, and hydrides of metals with relatively low thermal neutron absorption cross sections (i.e., less than 20 barns), such as zirconium hydride. "Solid moderator" as used in this specification is intended to have such meaning. Graphite is of particular interest as the moderator.

The coolant tubes may be fabricated of a wide variety of metals of relatively low thermal neutron absorption cross section including stainless steel (particularly the 300 series stainless steels), nickel-chromium alloys, titanium, aluminum and its alloys such as the cermet Al–6–8% $Al_2O_3$, zirconium, and the zirconium alloys developed for nuclear reactor service, for instance Zr–1.5% Sn. The zirconium alloys are particularly suitable for use in water-cooled reactors because of their relatively low cross section, and satisfactory mechanical and corrosion properties.

The fuel elements are subject to wide variation in their composition. The fuel elements may be comprised of uranium, thorium, and plutonium, either singly or in combination. The fissile material may be in the form of the metal or alloys such as U–Th, U–Mo, U–Nb, U–Si, U–Zr, and in the form of ceramics such as $UO_2$, carbides of uranium, UN, USi, cermet combinations, and dispersion of refractories in diluent matrices, for example $UC_2$ or $UO_2$ in graphite. Thus, "fuel element" as used in this specification is intended to have such significance. It is not necessary to clad the fuel element as in the case of where coolant directly contacts the fuel element and cladding is necessary to prevent possible contamination of the steam prime mover. This effects a considerable savings in fuel cycle costs since applying cladding to effect thermal bonding between fuel and cladding and to prevent the escape of fission products involves intricate techniques. Fission products which are released from the fuel are retained in the primary reactor core enclosure, and risk of escape therefrom is minimal.

Since cladding of the fuel element is not necessary, fission products which diffuse to the surface of the fuel may be removed to improve fuel reactivity through poison removal. Such may be accomplished by passing a sweep gas through the annulus between the fuel element and the graphite block and in the smaller annulus between the graphite and the coolant tube. The sweep gas system is suitably a closed cycle system with purification. After being pumped through the annuli, the gas is exhausted to a purification system whose purpose is to remove fission product gases and graphite off-gas products before it is reintroduced into the core. Any inert, stable gas may be used as the sweep gas, but it is generally preferred to use a noble gas such as helium or argon. Fission product removal is accomplished by methods known to the art, for example, by scrubbing with caustic or water, or absorption with such absorbers as charcoal, or by a combination of such means.

To reduce the level of fission product activity in the sweep gas system, or to totally eliminate the need for such a system, the fuel element can be clad where desired. Simple, relatively inexpensive ceramic coatings, as distinguished from full metal claddings, markedly reduce fission product release and ease the requirements of the sweep gas system. For instance, pyrolytic carbon and siliconized carbide coatings are generally satisfactory, and alumina or beryllia-coated $UO_2$ in a graphite matrix are also feasible.

My unit cell design may be satisfactorily used in reactors of varying type and design, with varying moderators and coolants. For example, my unit cell can provide the basis of the core of the reactor described in U.S. Patent 2,806,820.

Figure 3:
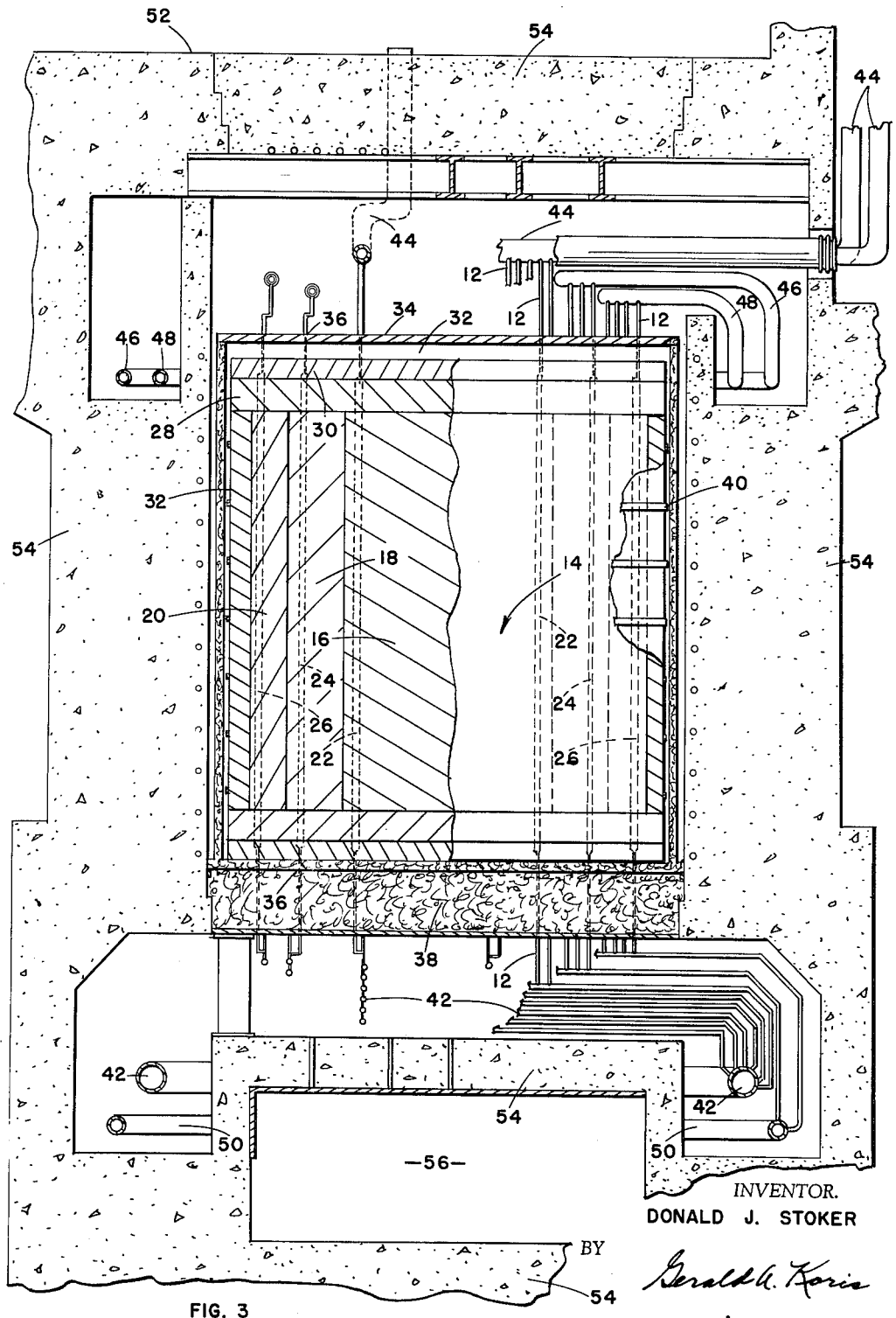
FIG. 3 is a sectionalized elevation of the core of one reactor employing my unit cell.

Another example will be given in more detail of the use of my invention in a graphite-moderated, boiling water reactor with integral nuclear superheat. The reactor core comprises a plurality of the unit cells shown in FIGS. 1–2. The reactor core is shown in sectionalized elevation in FIG. 3.

Superheated steam is produced directly in the reactor by dividing the core 14 into three concentric annular regions; namely, a boiling 16, a first superheat 18, and a second superheat region 20. The center region 16, where about two-thirds of the total heat is generated, is the boiler region. A mixture of feed water and water from a steam drum is pumped through headers 42 and the boiler tubes 22. The effluent steam-water mixture is carried in headers 44 to a steam drum where it is separated. The saturated steam is returned in headers 46 to the reactor and makes two passes 24 and 26 through the reactor where it is superheated to 1000° F. before being piped by header 48 to the turbine. Redistribution headers 50 are provided between the two passes of the superheated steam.

The fuel lattices are of identical design for all three regions, differing from each other only in the type and wall thickness of the coolant tube material. The moderator bodies are 9½" square graphite lattices 4 with 4" diameter fuel slugs 8 in the corners of each lattice. Four vertical ⅝" I.D. coolant tubes 10 penetrate each lattice at points on its two diagonals, such that there is a minimum graphite thickness of ¼" between the surface of each fuel element and the surface of the adjacent tubes. The fuel elements consist of $UC_2$ distributed in a graphite matrix.

Each set of four coolant tubes is joined to common cell pipes 12 located above and below the cell. Each set of vertical coolant tubes penetrates the full length of the graphite moderator columns 4. These columns are made of individual moderator blocks which are coupled together by keys and/or screw-type connectors. Clearance is provided between adjacent moderator blocks to allow for thermal expansion and growth or shrinkage due to the Wigner effect of radiation. The moderator column is assembled complete with coolant tubes 10, reflector 28, thermal shields 30, and insulation 32.

This core design requires 1,829 such units. It gives an active core size of approximately 38 ft. in diameter by 31 ft. high. A 2½ ft. thick graphite reflector covers the active core at the top and bottom and a 1½ ft. thick reflector radially surrounds the core. Thermal and biological shielding and heat insulation around the reflector assure access to areas where maintenance is required and keep heat losses to a minimum. To assure the absolute containment of all fission products, the whole structure is in a containment shell 34 which is maintained at slightly below atmospheric pressure. The penetrations 36 of the pipes through this containment shell are designed in such a manner that flexibility for the difference in thermal expansion between containment shell and coolant tube is assured while maintaining leak tightness. This is obtained by welding the tubes to one end of an expansion bellows-type joint and welding the other end of the expansion joint to the containment shell.

The whole reactor core is supported on a grid structure 38. The grid structure is made of heavy steel girders arranged to assure free access to every fuel channel and to provide free penetration for the coolant pipe to each lattice. The core is supported on the bottom grid structure and is free to move upward with thermal expansion. Movement of the core in the radial direction is made possible by providing expanding bands 40 to hold the core together radially and to permit breathing of the core at the same time. Space is provided between each column to permit differential expansion between adjacent columns.

Provisions are made for control rods in the boiler region and in the first superheater region. The control rods are inserted from the top of the reactor into the designated fuel channel. Since little heat is generated in the control rod channels, no coolant tubes are provided in the lattice corners, which are facing the control rods. A radial clearance of 100 mils is allowed for annulus 9 between the graphite channels and the fuel element to allow for dimensional changes and tolerances in either the moderator or fuel element. A radial clearance of 5 mils is allowed for annulus 13 between the coolant tubes and the graphite moderator for the same purpose.

The reactor is positioned below grade 52 and is surrounded by concrete biological shielding 54. Fuel handling is accomplished in a sub-pile room 56.

Complete design details of this reactor are listed below.

Coolant cycle:
- Net electrical power _____ 300 mw.
- Gross electrical power ___ 318 mw.
- Reactor thermal power [1] __ 811 mw.
- Net plant efficiency _____ 37%.
- Turbine inlet pressure ____ 1450 p.s.i.a.
- Turbine inlet temperature _ 1000° F.
- Turbine flow _____ 2.46×10⁶ lb./hr.
- Reactor feedwater temperature _____ 440° F.
- Boiler recirculation rate __ 20.61×10⁶ lb./hr.
- Recirculation pump _____ Controlled seal leakage.
- Number of recirculation pumps _____ 4.
- Horsepower per recirculation pump _____ 3000.

Overall reactor core:
- Nominal active core diameter _____ 38 ft.
- Nominal active core height _____ 31 ft.
- Nominal diameter boiler region _____ 27 ft.
- Number of superheater passes _____ 2.
- Lattice shape _____ Square.
- Lattice size _____ 9½ in.
- Total number of lattices__ 1829.
- Moderator material _____ Type TSF graphite.
- Number of coolant tubes per lattice _____ 4.
- Minimum thickness of moderator between coolant tube and fuel element _____ ¼ in.
- Thermal conductivity of moderator [2] _____ 20–25 B.t.u./° F.-ft.-hr.
- Maximum heat flux-based on ⅝ in. I.D. tube ____ 200,000 B.t.u./hr.-ft.².
- Average heat flux-based on ⅝ in. I.D. tube _____ 71,400 B.t.u./hr.-ft.².
- Axial peak flux/average flux _____ 1.5
- Radial peak flux/average flux _____ 1.87.
- Average specific power ___ 4.86 kw./kg.
- Weight of uranium _____ 167,000 kg.
- Enrichment—at equilibrium _____ 2.6 a/o.

[1] Includes 5% reactor heat loss.
[2] 20 B.t.u./° F.-ft-hr. used for average conditions. 25 B.t.u./° F.-ft-hr. used for peak conditions.

Overall reactor core:—Continued
- Enrichment—initial core loading _____ 2.2 a/o.
- Initial conversion ratio (at 2.2 a/o enrich.) _____ 0.55.
- Effective multiplication—hot and clean (at 2.2 a/o enrichment) _____ 1.07
- Average neutron thermal flux _____ 1.28×10¹³ n./cm.²/sec.
- Weight of core graphite __ 2.96×10⁶ lb.

Boiling region:
- Inlet water temperature ____ 592° F.
- Outlet water temperature __ 611° F.
- Exit quality _____ 12%.
- Coolant velocity—inlet max. power tube _____ 23.5 ft./sec.
- Maximum heat flux-based on ⅝ in. I.D. tube _____ 200,000 B.t.u./hr.-ft.².
- Average heat flux-based on ⅝ in. I.D. tube _____ 98,600 B.t.u./hr.-ft.².
- Total heat removed _____ 1.74×10⁹ B.t.u./hr.
- Number of fuel channels ___ 867.
- Number of control rods ___ 61.
- Number of source cells ____ 1.
- Number of lattices _____ 929.
- Number of coolant tubes ___ 3468.
- Coolant tube material _____ 304 SS.
- Corrosion allowance on wall _____ 10 mils.
- Tube design temperature __ 700° F.
- Tube design pressure _____ 1850 p.s.i.
- Tube design stress _____ 14,800 p.s.i.
- Coolant tube dimensions ___ 0.625 I.D.; 0.730 O.D. in.
- Inlet pressure _____ 1800 p.s.i.
- Outlet pressure _____ 1670 p.s.i.
- Maximum moderator temperature _____ 1323° F.
- Average moderator temperature _____ 995° F.
- Maximum fuel element surface temperature _____ 2510° F.
- Maximum fuel element center temperature _____ 3030–3380° F.
- Average fuel element surface temperature _____ 1935° F.
- Average fuel element center temperature _____ 2203–2380° F.

Superheat region—1st pass:
- Inlet temperature _____ 609° F.
- Inlet pressure _____ 1640 p.s.i.
- Outlet temperature _____ 800° F.
- Outlet pressure _____ 1595 p.s.i.
- Coolant velocity-inlet maximum power tube _____ 56 ft./sec.
- Coolant velocity-outlet maximum power tube _____ 93 ft./sec.
- Maximum heat flux-based on ⅝ in. I.D. tube _____ 104,000 B.t.u./hr.-ft.².
- Average heat flux-based on ⅝ in. I.D. tube _____ 59,500 B.t.u./hr.-ft.².
- Total heat removed _____ 0.491×10⁹ B.t.u./hr.
- Number of fuel channels __ 408.
- Number of control rods ___ 28.
- Number of lattices _____ 436.
- Number of coolant tubes __ 1632.
- Coolant tube material ____ 304 SS.
- Corrosion allowance on wall _____ 15 mils.
- Tube design temperature ___ 900° F.
- Tube design pressure _____ 1700 p.s.i.
- Tube design stress _____ 14,000 p.s.i.
- Coolant tube dimensions __ 0.625 I.D.; 0.740 O.D. in.

Superheat region—1st pass:—Continued
  Nominal radial thickness of region _____ 3 ft.
  Maximum moderator temperature _____ 1200° F.
  Average moderator temperature _____ 1000° F.
  Maximum fuel element surface temperature _____ 2040° F.
  Maximum fuel element center temperature _____ 2310–2490° F.
  Average fuel element surface temperature _____ 1640° F.
  Average fuel element center temperature _____ 1800–1897° F.
Superheat region—2nd pass:
  Inlet temperature _____ 800° F.
  Inlet pressure _____ 1575 p.s.i.
  Outlet temperature _____ 1003° F.
  Outlet pressure _____ 1500 p.s.i.
  Coolant velocity-inlet maximum power tube _____ 92 ft./sec.
  Coolant velocity-outlet maximum power tube _____ 121 ft./sec.
  Maximum heat flux-based on ⅝ in. I.D. tube _____ 68,000 B.t.u./hr.-ft.$^2$.
  Average heat flux-based on ⅝ in. I.D. tube _____ 34,800 B.t.u./hr.-ft.$^2$.
  Total heat removed _____ 0.328×10$^9$ B.t.u./hr.
  Number of fuel channels ___ 464.
  Number of lattices _____ 464.
  Number of coolant tubes ___ 1856.
  Coolant tube material _____ 347 SS.
  Corrosion allowance on tube wall _____ 15 mils.
  Tube design temperature ___ 1100° F.
  Tube design pressure _____ 1650 p.s.i.
  Tube design stress _____ 12,500 p.s.i.
  Coolant tube dimensions ___ 0.625 I.D.; 0.745 O.D. in.
  Nominal radial thickness of region _____ 2.5 ft.
  Maximum moderator temperature _____ 1240° F.
  Average moderator temperature _____ 1075° F.
  Maximum fuel element surface temperature _____ 1840° F.
  Maximum fuel element center temperature _____ 2010–2135° F.
  Average fuel element surface temperature _____ 1465° F.
  Average fuel element center temperature _____ 1550–1615° F.
Fuel elements:
  Cladding material _____ None.
  Dimensions _____ 4 in. diam.; 12 in long.
  Material _____ UC$_2$ in graphite matrix 50 w/o U.
  Density of fuel mixture ____ 2.5 gm./cc.
  Enrichment initial core ____ 2.2 a/o U–235.
  Enrichment — at equilibrium _____ 2.6 a/o U–235.
  Thermal conductivity _____ 12 – 20 B.t.u./° F.-hr.-ft.
  Maximum center temperature _____ 3080–3380° F.
  Maximum surface temperature _____ 2510° F.
  Total number of fuel elements _____ 54,000.
  Density of U in fuel _____ 1.25 gm./cm.$^3$.
  Density of C in fuel _____ 1.25 gm./cm.$^3$.
  Total weight of fuel elements _____ 334,000 kg.

Fuel elements:—Continued
  Fuel exposure—at equilibrium _____ 15,000 mwd./T.
Reflector:
  Nominal radial thickness __ 1.5 ft.
  Nominal end thickness ____ 2.5 ft.
  Material _____ Type CS graphite.
  Weight of reflector _____ 1.3×10$^6$ lb.
  Total heat removed _____ 0.079×10$^9$ B.t.u./hr.
  Coolant tube dimensions ___ 0.625 I.D.; 0.730 O.D. in.
  Number of coolant tubes ___ 200.
  Coolant tube material _____ 304 SS.

Having thus described my invention, I claim:

1. A nuclear reactor core unit cell comprising a solid moderator block having a plurality of sides, a peripheral, longitudinal recess in each said side defining a fuel channel segment, a fuel element disposed in each said channel, at least one coolant tube for each said segment, each said tube disposed in a bore extending longitudinally through said block substantially parallel and immediately adjacent to said fuel channel along each of at least one line dividing said fuel channel segment into equal parts, the distance between each said fuel channel segment and its associated coolant tube in a plane transverse to the longitudinal axes of said segments and said tubes being substantially less than the distances between adjacent segments and between the coolant tubes of adjacent segments, and a coolant passing exclusively through said tubes.

2. The unit cell of claim 1 wherein each said recess is located at each peripheral corner of said multi-sided moderator block.

3. The unit cell of claim 1 wherein one coolant tube is provided for each said fuel channel segment.

4. The unit cell of claim 1 wherein each said coolant tube extending through said moderator block communicates with a common coolant inlet tube to said block at one end thereof and with a common coolant exit tube from said block at the other end thereof.

5. A unit cell for a nuclear reactor core comprising a rectangular moderator block, a peripheral, longitudinal recess at each corner of said block defining a fuel channel segment, a fuel element disposed in each channel, a bore for each said channel longitudinally extending through said moderator block immediately adjacent and substantially parallel to each said segment along a line bisecting said segment, a coolant tube positioned in each said bore, the distance between each said fuel channel segment and its associated coolant tube in a plane transverse to the longitudinal axes of said segments and said tubes being substantially less than the distances between adjacent segments and between the coolant tubes of adjacent segments, said coolant tubes joining a common inlet tube to said block at one end thereof and joining a common coolant exit tube from said block at the other end thereof, and a liquid coolant passing exclusively through said coolant tubes.

6. The unit cell of claim 5 wherein said moderator is graphite.

7. The unit cell of claim 5 wherein said moderator block is graphite, said coolant tubes are selected from a metal from the class consisting of stainless steel, zirconium alloys, and aluminum alloys, and said fuel element consists of a fissile material selected from the group consisting of uranium oxide and uranium carbide.

References Cited by the Examiner
UNITED STATES PATENTS

| | | | |
|---|---|---|---|
| 2,708,656 | 5/1955 | Fermi et al. | 176—41 |
| 2,832,733 | 4/1958 | Szilard et al. | 176—52 |
| 2,929,768 | 3/1960 | Mahlmeister et al. | 176—41 |
| 3,010,888 | 11/1961 | Battle | 176—84 |

(Other references on following page)

FOREIGN PATENTS 1,244,002  9/1960  France.
782,888  9/1951  Great Britain.

OTHER REFERENCES

Daniels: Nucleonics (vol. 14, No. 3), March 1956, pages 34–41.

Dollezhal et al.: Proceedings of the Second United Nations International Conference on the Peaceful Uses of Atomic Energy, vol. 8, September 1958, pages 86–91.

Starr et al.: Sodium Graphite Reactors, September 1958, page 141.

CARL D. QUARFORTH, *Primary Examiner.*

ROGER L. CAMPBELL, REUBEN EPSTEIN,
*Examiners.*